United States Patent
Ogawa

(10) Patent No.: US 6,981,437 B2
(45) Date of Patent: Jan. 3, 2006

(54) PIPE CUTTING MACHINE

(75) Inventor: Gen Ogawa, Chiryu (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 0 days.

(21) Appl. No.: 10/973,434

(22) Filed: Oct. 27, 2004

(65) Prior Publication Data

US 2005/0115371 A1    Jun. 2, 2005

(30) Foreign Application Priority Data

Oct. 31, 2003    (JP) .............................. 2003-371622

(51) Int. Cl.
*B23B 5/14*    (2006.01)
(52) U.S. Cl. ................. 82/70.2; 82/46; 82/83
(58) Field of Classification Search .............. 82/59, 82/66, 67, 69, 70.1, 70.2, 85, 84, 46
See application file for complete search history.

(56) References Cited

U.S. PATENT DOCUMENTS

| | | | | |
|---|---|---|---|---|
| 4,111,346 A | * | 9/1978 | Bertolette | 225/96.5 |
| 4,430,913 A | * | 2/1984 | Williamson | 82/70.2 |
| 5,207,136 A | * | 5/1993 | Evard et al. | 82/130 |
| 5,881,616 A | * | 3/1999 | Nanzai | 82/72 |

FOREIGN PATENT DOCUMENTS

JP    8-257832    10/1996

* cited by examiner

*Primary Examiner*—Willmon Fridie, Jr.
(74) *Attorney, Agent, or Firm*—Oblon, Spivak, McClelland, Maier & Neustadt, P.C.

(57) ABSTRACT

A pipe cutting machine comprises a clamping device for holding a pipe to be cut and a pipe cutting apparatus for cutting the pipe by revolving a rotating disc-like cutting blade around the circumferential surface of the pipe held by the clamping device. The pipe cutting apparatus is provided with a revolution motion member of an annular shape rotatably supported by a support member secured to a main frame thereof for revolving a cutting blade around a pipe to be cut; an arm pivotally supported on one side surface of the revolution motion member at one end thereof and rotatably carrying the cutting blade at the other end thereof; a swing motion member of an annular shape rotatably supported by the support member in axial alignment with the revolution motion member for swinging the arm; a rotation motion member of an annular shape rotatably supported by the support member in axial alignment with the revolution motion member for rotating the cutting blade; and plural motors mounted on the main frame for respectively rotating the revolution motion member, the swing motion member and the rotation motion member through driving belts.

18 Claims, 5 Drawing Sheets

PIPE CUTTING MACHINE

INCORPORATION BY REFERENCE

This application is based on and claims priority under 35 U.S.C. 119 with respect to Japanese Application No. 2003-371622 filed on Oct. 31, 2003, the entire content of which is incorporated herein by reference.

BACKGROUND OF THE INVENTION

1. Field of the Invention

The present invention relates to a pipe cutting machine for cutting a pipe by revolving a rotating disc-like cutting blade around the circumferential surface of the pile supported on a clamping device.

2. Discussion of the Related Art

As pipe cutting machine of this kind, there has been known one described in Japanese unexamined, published patent application No. 8-257832 (257832/1996). Referring now to the accompanying drawings, the known pipe cutting machine is provided with a casing 16 provided on a machine body 2 to be swingable about a support shaft 16a, a rotary member 32 carried by the casing 16 to be rotatable about the axis of a pipe 11 to be cut, and an arm 40 carried on the rotary member 32 to be swung about the axis of an second rotational shaft 38 for moving a cutting blade 54 toward and away from the pipe 11 and to be fixed on the rotary member 32 at a desired position so that the infeed position of the cutting blade 54 can be adjusted for the diameter of the pipe 11 to be cut. The known cutting machine is further provided with a revolution drive motor 18 as revolution drive means for rotating the rotary member 32 and a rotation drive motor 20 as rotation drive means for rotating the cutting blade 54.

In the known pipe cutting machine, the cutting blade 54 is rotated by transmitting the rotational power of the rotation drive motor 20 to a gear portion 51 and an output shaft 50 through a first rotational shaft 24, a pinion 28, an idle gear 23, a pinion 41, the second rotational shaft 38, a gear portion 42 and an idle gear 44. Then, the casing 16 is swung by a swing drive cylinder 58 about the support shaft 16a to a cutting position, whereby the rotating cutting blade 54 is cut into the pipe 11. Further, the rotational power of the revolution drive motor 18 is transmitted to a pinion 19 and a gear portion 32a to rotate the rotary member 32, whereby a revolution motion is given to the arm 40 fixedly positioned on the rotary member 32 and hence, to the cutting blade 54 carried on the arm 40.

In the foregoing pipe cutting machine, the complexity in the mechanism for rotating the cutting blade 54 causes trouble or breakdown to occur frequently, and the complexity in the mechanism further causes it difficult to easily carry out the repair in the event of the trouble or breakdown. In addition, there arises another problem that the mechanism for making the cutting blade 54 cut into the pipe 11 takes a large-scale construction thereby to cause the pipe cutting machine to become great as a whole.

SUMMARY OF THE INVENTION

Accordingly, the present invention is made to solve the foregoing various problems, and it is a primary object of the present invention to provide an improved pipe cutting machine capable of being simplified in construction and being down sized.

Briefly, according to the present invention, there is provided a pipe cutting machine having a clamping device for holding a pipe to be cut and a pipe cutting apparatus for cutting the pipe by revolving a rotating disc-like cutting blade around the circumferential surface of the pipe held by the clamping device. The pipe cutting apparatus comprises a main frame; a support member secured to the main frame; a revolution motion member of an annular shape rotatably supported by the support member for revolving the cutting blade; an arm pivotally supported on one side surface of the revolution motion member at one end thereof and rotatably carrying the cutting blade at the other end thereof; a swing motion member of an annular shape rotatably supported by the support member in axial alignment with the revolution motion member for swinging the arm; a rotation motion member of an annular shape rotatably supported by the support member in axial alignment with the revolution motion member for rotating the cutting blade; plural motors mounted on the main frame for respectively rotating the revolution motion member, the swing motion member and the rotation motion member; and plural rotation transmission mechanisms for transmitting rotational drive powers from the plural motors respectively to the revolution motion member, the swing motion member and the rotation motion member.

With this construction, the rotation motion member is rotated by the motor for rotation motion to rotate the cutting blade. The swing motion member is rotated by the motor for swing motion, and thus, the arm is swung to make the rotating cutting blade cut into the pipe. Further, the revolution motion member pivotably carrying the arm is rotated by the motor for revolution motion to give the arm a revolution motion, whereby the rotating cutting blade is revolved around the circumferential surface of the pipe while cutting the pipe. Accordingly, since the pipe can be cut by the cutting blade, the arm, the revolution motion member, the swing motion member and the rotation motion member which are all accommodated in the support member secured to the main frame, the pipe cutting machine can be simplified in construction and can be downsized as a whole. Further, since the respective motors are not mounted in the support member or on the respective rotational members, but are mounted on the main frame, the respective rotational members and the support member which supports these rotational members can be prevented from becoming great in size, so that the pipe cutting machine can be downsized as a whole.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
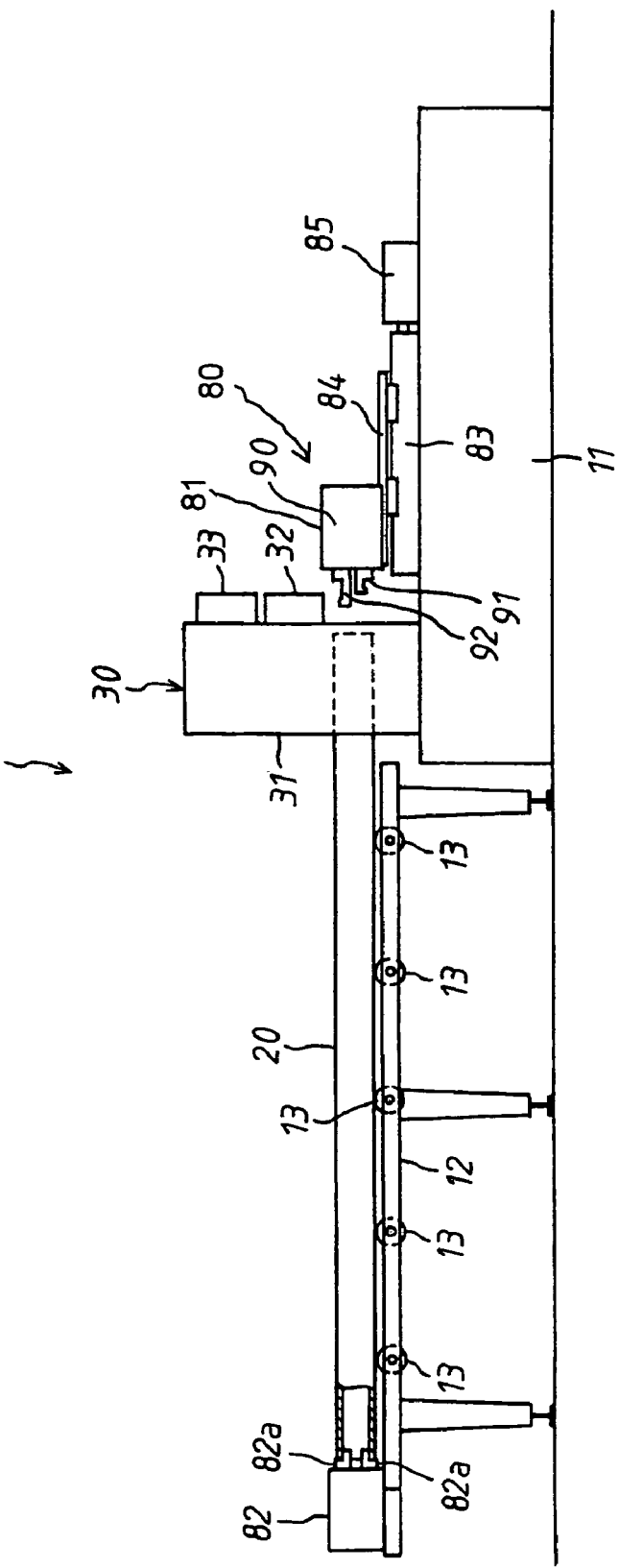
FIG. 1 is a front view of a pipe cutting machine provided with a pipe cutting apparatus in one embodiment according to the present invention.
Figure 2:
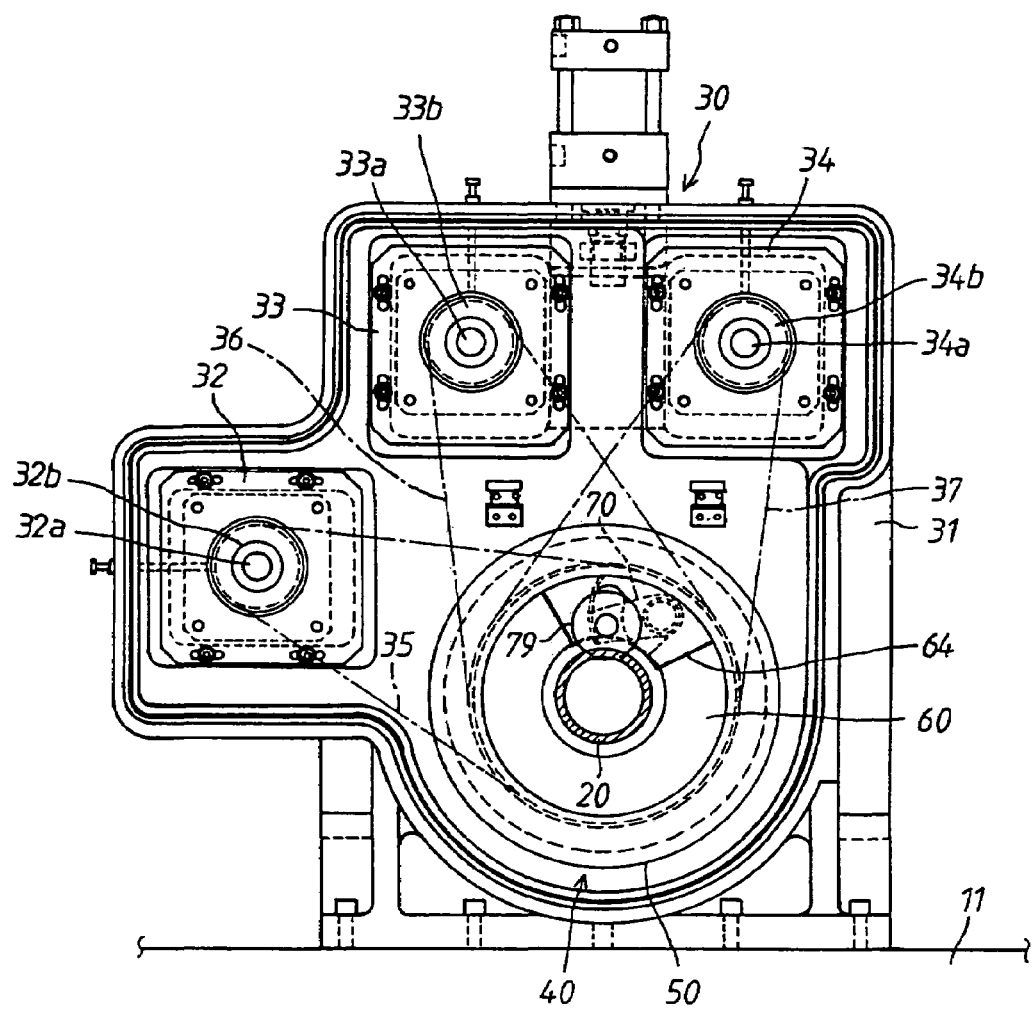
FIG. 2 is a right side view of the cutting apparatus.
Figure 3:
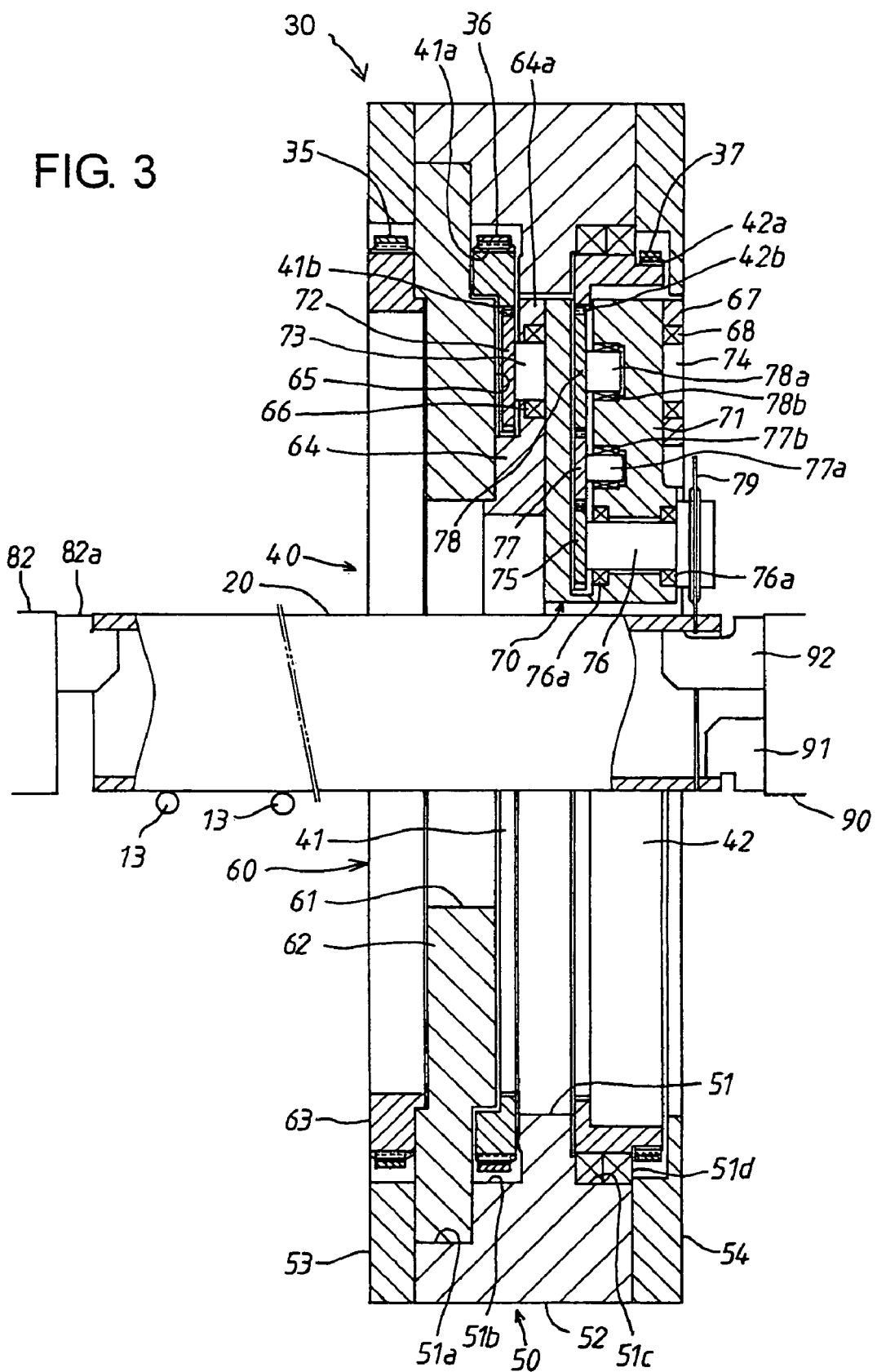
FIG. 3 is an enlarged sectional view showing a cutting section shown in FIG. 2.
Figure 4:
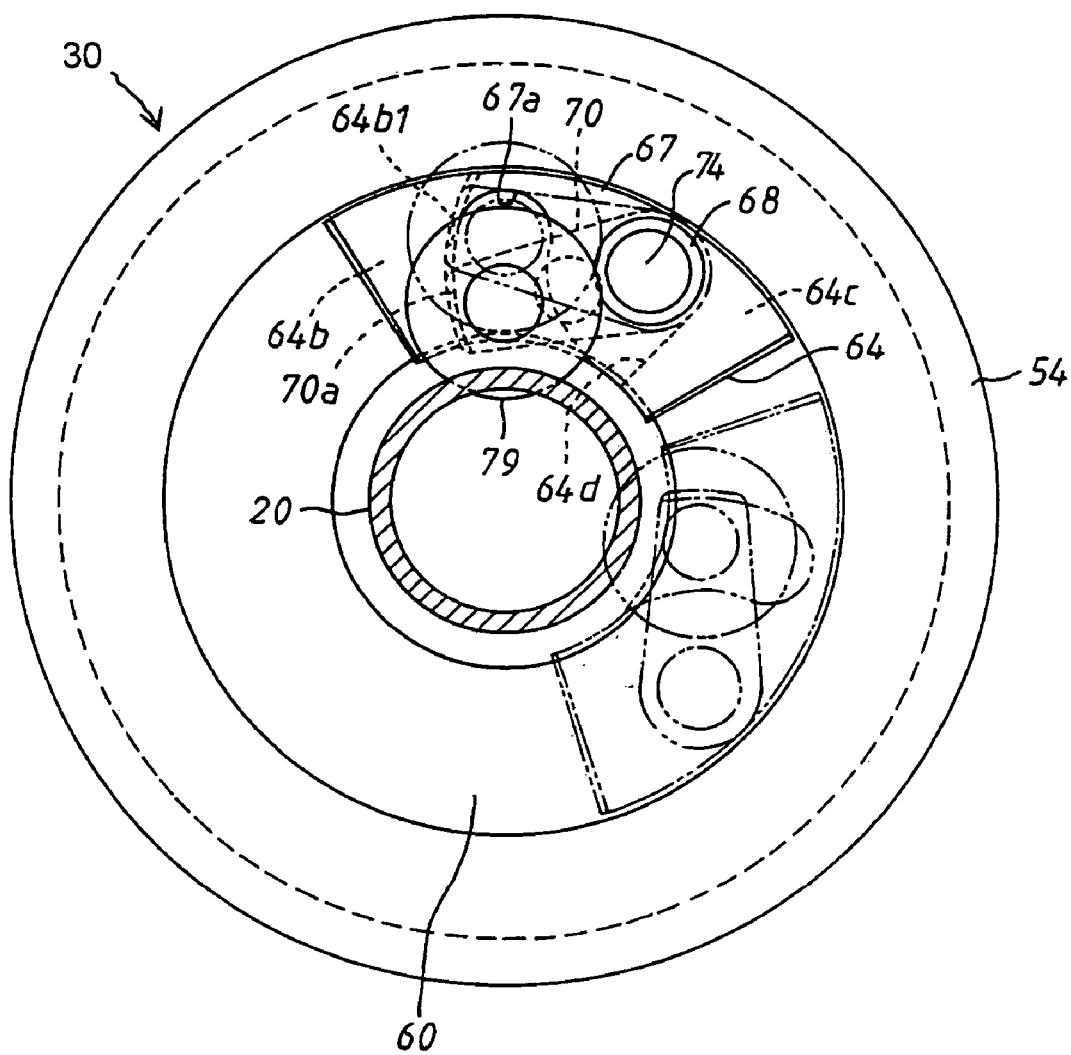
FIG. 4 is a right side view showing the cutting section shown in FIG. 2.

Hereafter, a pipe cutting machine in one embodiment according to the present invention will be described with reference to the accompanying drawings. FIG. 1 is a front view showing the pipe cutting machine 10, FIG. 2 is a right side view of a pipe cutting apparatus 30 provided in the pipe cutting machine 10, FIG. 3 is a sectional view showing a cutting section of the pipe cutting apparatus 30, and FIG. 4 is a right side view showing the cutting section. The pipe cutting machine 10 is of the type that cuts a long, straight pipe 20 and is provided with the cutting apparatus 30 for cutting the pipe 20 and a clamping device 80 for conveying the pipe 20 to a cutting position inside of the cutting apparatus 30 and for holding the pipe 20 at the cutting position. Herein, the term "pipe" means not only a so-called pipe but also the equivalent which takes a generally cylindrical shape.

As shown in FIGS. 1 and 2, the pipe cutting apparatus 30 is placed on a machine base 11. The cutting apparatus 30 is provided with a box-like main frame 31. As best shown in FIG. 2, the main frame 31 incorporates at its lower center portion a cutting section 40 for cutting the pipe 20 inserted into the main frame 31. The main frame 31 fixedly mounts on a right side wall surface a revolution drive motor 32, a swing drive motor 33 and a rotation drive motor 34 for respectively rotating a revolution motion member 60, a swing motion member 41 and a rotation motion member 42 which will be referred to later in detail.

As shown mainly in FIG. 3, the cutting section 40 is provided with a support member 50 secured to the main frame 31. The support member 50 rotatably carries the revolution motion member 60 for making a cutting blade 79 revolve around the circumferential surface of the pipe 20, the swing motion member 41 for swinging an arm 70 and the rotation motion member 42 for rotating the cutting blade 79. The revolution motion member 60 swingably supports thereon a root end portion of the arm 70, whose swing motion end rotatably supports the cutting blade 79. The swing motion member 41 and the rotation motion member 42 are arranged in axial alignment with the revolution motion member 60. The revolution motion member 60, the swing motion member 41 and the rotation motion member 42 respectively take plate or disc-like shapes and are juxtaposed with one another in axial alignment to be rotatable in the support member 50.

The support member 50 is provided with a support frame 52 having a through hole 51 formed to be circular in cross-section. The support frame 52 has formed at its left end portion a sliding support portion 51a of an annular recess, which slidably supports therein the circumferential portion of the revolution motion member 60. The support frame 52 has also formed at the right side of the sliding support portion 51a another sliding support portion 51b which is an annular recess smaller in diameter than the sliding support portion 51a. The sliding support portion 51b slidably supports therein the circumferential edge portions of the swing motion member 41. Further, the support frame 52 has also formed at its right end another sliding support portion 51c of an annular recess, which slidably supports therein a circumferential portion of the rotation motion member 42.

A first annular holding plate 53 is secured to the left end surface of the support frame 52. The revolution motion member 60 is put between the first annular holding plate 53 and the sliding support portion 51a and is rotatably supported in the support member 50. The swing motion member 41 is put between the revolution motion member 60 and the sliding support portion 51b and is rotatably supported in the support member 50. Further, a second annular holding plate 54 is secured to the right end surface of the support frame 52. The rotation motion member 42 is put between the second annular holding plate 54 and the sliding support portion 51c and is rotatably supported in the support member 50. Bearings 51d are interposed between the sliding support portion 51c and the rotation motion member 42.

The revolution motion member 60 is provided with an annular disc 62 which is formed with a through bore 61 (e.g., circular in cross-section) at its center portion. A ring gear 63 is bodily provided on the left end surface of the annular disc 62 in axial alignment with the same. The ring gear 63 has wound therearound a driving belt (toothed belt) 35 as a rotation transmission mechanism which is also wound around a pulley 32b fixed on an output shaft 32a of the revolution drive motor 32, as shown in FIG. 2, so that the revolution motion member 60 is rotated by the revolution drive motor 32. It is preferable to employ as the revolution drive motor 32 an electric motor (e.g., a servomotor or a stepping motor) which is controllable in the rotational angle and rotational speed thereof.

An arm support member 64 (shown in FIGS. 2 and 4) which takes a sector shape for swingably supporting the arm 70 is secured to the right end surface of the annular disc 62 with the left end surface thereof being in contact therewith. As shown in FIG. 3, the arm support member 64 is provided with a support portion 64a which is formed to face the right end surface of the annular disc 62 with a space 65 therebetween. The support portion 64a rotatably carries through a bearing 66 a pivot shaft 73 whose one end is secured to an arm main member 71. The pivot shaft 73 pierces through the support portion 64a and has coaxially and bodily secured to the other end thereof a swingable gear 72, which is received in the space 65 in meshing engagement with internal gear teeth 41b formed on the internal surface of the swing motion member 41.

As shown mainly in FIG. 4, a pair of land portions 64b, 64c are protruded from the right end surface of the arm support member 64 at both sides in the circumferential direction, and an arm receiving portion 64d for receiving the arm main member 71 therein is formed between the both of the land portions 64b, 64c. An engaging groove 64b1 is formed on an inner wall surface of the land portion 64b which faces the swing motion end of the arm 70. The engaging groove 641b slidably engages therein with an engaging ledge 70a which is formed on the swing motion end of the arm 70. Thus, the swing motion end of the arm 70 is reliably supported while the arm 70 is swung, so that the rigidity thereof can be heightened.

Further, a cover cap member 67 is secured on and over the pair of land portions 64b, 64c which are protruded from the right end surface of the arm support member 64 at both sides in the circumferential direction, and covers the arm receiving portion 64d which receives the arm main member 71 therein. The cover cap member 67 takes the same sector shape as the arm support member 64. The cover cap member 67 rotatably carries through a bearing 68 another pivot shaft 74 which is secured to the right wall surface of the arm main member 71. Thus, the supported root end of the arm 70 is reliably supported while the arm 70 is swung, so that the rigidity thereof can be heightened. In addition, the arm main member 71 is covered by the cover cap member 67 to be reliably supported thereby, so that the rigidity thereof can be heightened. A cutout portion 67a is formed on the cover cap member 67 for permitting a cutting blade rotational shaft 76 for the cutting blade 79 to move therein.

The arm 70 is pivotally supported on the arm support member 64 at its root end and rotatably carries the cutting blade 79 at the swing motion end thereof. The arm 70 is provided with the arm main member 71 of an elongated rectangular shape. As shown in FIG. 3, one end of the pivot shaft 73 which has fixed the swingable gear 72 to the other end thereof is secured to the left side wall surface of the arm main member 71. The other end of the pivot shaft 74 is secured to the right side wall surface of the root end of the arm main member 71 in axial alignment with the pivot shaft 73. The cutting blade rotational shaft 76 is rotatably carried on the swing motion end of the arm main member 71 through bearings 76a. The cutting blade rotational shaft 76 has a cutting blade drive gear 75 secured coaxially to the left end thereof and has the cutting blade 79 of a disc-like shape attached to the right end thereof. The cutting blade drive gear 75 is in meshing with internal teeth 42b of the rotation motion member 42 through first and second gears 77, 78 serving as a rotation transmission mechanism. The first and second gears 77, 78 are fixed on rotational shafts 77a, 78a, which are rotatably supported on the arm main member 71 through bearings 77b, 78b, respectively. The rotation transmission mechanism for the arm 70 may be constituted by one gear or a gear train composed of plural gears as is the case in the present embodiment, or may be constituted by a driving belt.

The swing motion member 41 is formed to be annual and have external teeth 41a and the aforementioned internal teeth 41b respectively formed on the whole of the circumferential surface and the whole of the internal surface thereof. The external teeth 41a has wound therearound a driving belt (toothed belt) 36 as a rotation transmission mechanism which is also wound around a pulley 33b secured to an output shaft 33a of the swing drive motor 33, as shown in FIG. 2. Thus, upon rotation of the swing drive motor 33, the swing motion member 41 is rotated to rotate the pivot shaft 73, whereby the arm 70 is swung. It is preferable to employ as the swing drive motor 33 an electric motor (e.g., a servomotor or a stepping motor) which is controllable in the rotational angle and rotational speed thereof.

The rotation motion member 42 is formed to be annual and has external teeth 42a and internal teeth 42b respectively formed on the whole of the circumferential surface and the whole of the internal surface thereof. The external teeth 42a has wound therearound a driving belt (toothed belt) 37 as a rotation transmission mechanism which is also wound around a pulley 34b secured to an output shaft 34a of the rotation drive motor 34. Thus, upon rotation of the rotation drive motor 34, the rotation motion member 42 is rotated to rotate the second and first gears 78, 77. This causes the cutting blade rotational shaft 76 to be rotated about the axis of the same, whereby the cutting blade 79 is rotated. As the rotation drive motor 34, there may be employed not only an electric motor (e.g., a servomotor or a stepping motor) which is controllable in the rotational angle and rotational speed thereof, but also an electric motor (e.g. a DC motor with brushes or an induction motor) which is not controllable in the rotational angle and the rotational speed thereof.

Next, the clamping device 80 will be described. As shown mainly in FIG. 1, the cramping device 80 is composed of first and second clamping devices 81, 82 which respectively support a cut end (i.e., right end) portion of the pipe 20 and the other end (i.e., left end) portion opposite to the cut end portion of the pipe 20. The first clamping device 81 is provided on the machine base 11 and is adjacent to the cutting apparatus 30 at the right side of the same. The first clamping device 81 is fixedly mounted on a slide base 84 which is provided to be slidable along a guide base 83 in a transfer direction (the right-left direction as viewed in FIG. 1). The slide base 84 has secured to a lower surface thereof a nut (not shown) being in screw engagement with a feed screw (not shown), which is provided to be bodily rotatable with an output shaft of a feed motor 85 through a coupling (not shown). Thus, upon rotation of the feed motor 85, the slide base 84 and hence, the first clamping device 81 are moved along the guide base 83.

The second clamping device 82 is provided to be movable in the transfer direction on a pipe feed frame 12, which is arranged at the left side of the machine base 11 to be adjacent thereto for transferring the pipe 20 toward the cutting apparatus 30. The second clamping device 82 is provided with plural (preferably, three) chuck claws 82a (two only shown in FIG. 1), which are engaged with the internal surface of a non-cut end portion opposite to the cut end portion of the pipe 20 for holding or gripping the non-cut end portion of the pipe 20. While gripping the non-cut end portion of the pipe 20, the second clamping device 82 is moved on the pipe feed frame 12 to follow the first clamping device 81 when the same is moved bodily with the pipe 20 gripped thereby for positioning the pipe 20 relative to the cutting blade 79, as described later in more detail. Plural rollers 13 are arranged on the top of the pipe feed frame 12 at regular intervals to extend in parallel relation with one another. Thus, in transferring the pipe 20, it can be done easily and reliably to transfer and position the pipe 20 to a desired cutting position. And, during the cutting of the pipe 20, it can be done reliably to securely hold the non-cut end of the pipe 20.

Figure 5:
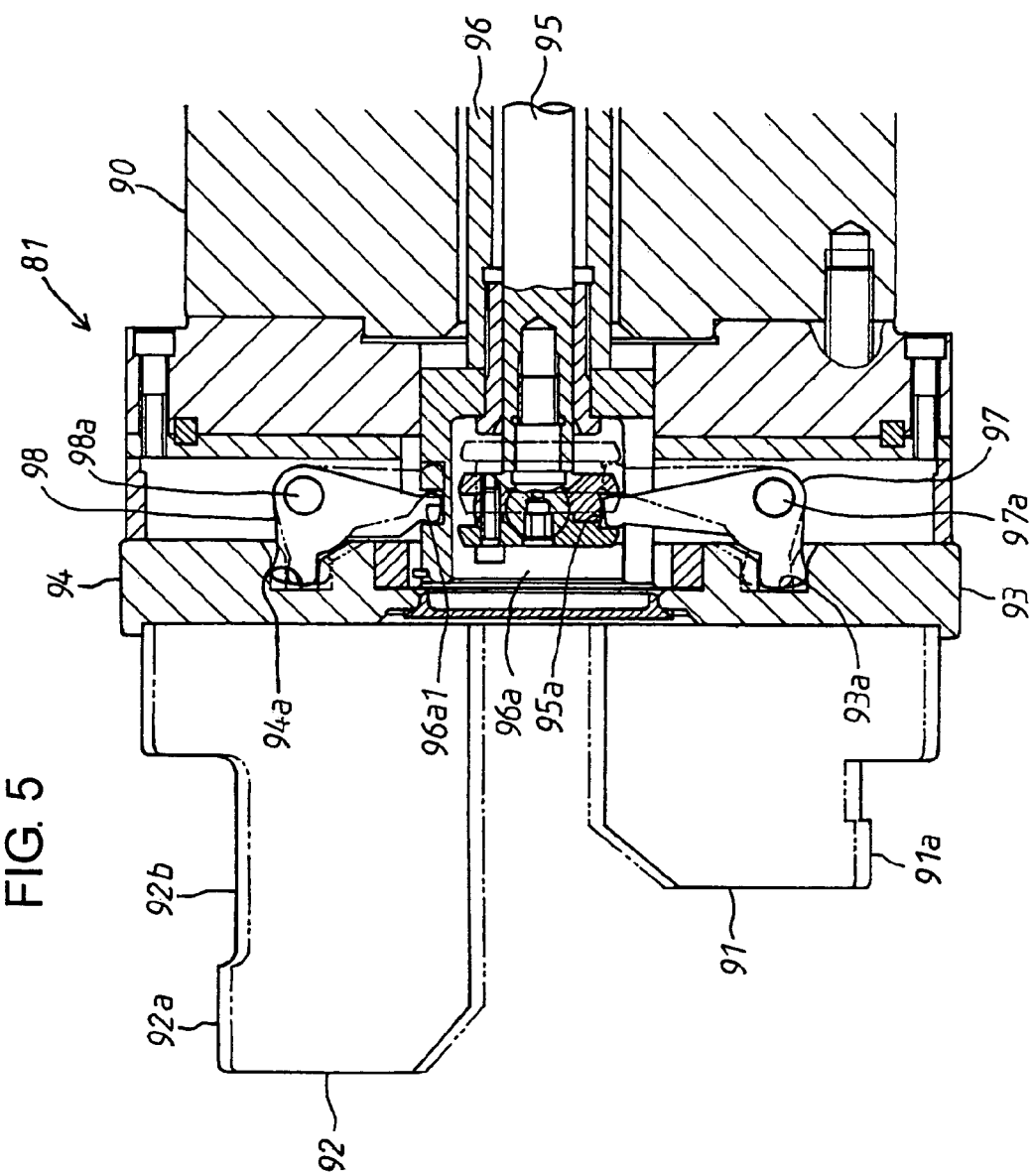
FIG. 5 is a fragmentary sectional view of a first clamping device shown in FIG. 1.

As shown mainly in FIG. 5, the first clamping device 81 is provided with plural first chuck claws 91 and plural second chuck claws 92, which respectively constitute first and second clamping mechanisms for respectively holding a first portion of the pipe 20 to be cut away and a second portion of the pipe 20 to be left without being cut away. Each set of the first and second chuck claws 91, 92 are composed of e.g., three pieces in this particular embodiment for supporting the internal surface of the pipe 20 by being inserted into the pipe 20. The first chuck claws 91 are arranged at regular angular intervals (120-degree intervals in this particular embodiment) in the circumferential direction, and similarly, the second chuck claws 92 are arranged at the same regular angular intervals in the circumferential direction so that the first chuck claws 91 are opposed respectively to the second chuck claws 92 in the diametrical direction. The first chuck claws 91 are provided for holding the first portion to be cut away from the pipe 20, that is, the portion close to the right opening end of the pipe 20, while the second chuck claws 92 are provided for holding the second portion which is to be left without being cut away from the pipe 20, that is, the portion which is back by a predetermined distance from the first portion held by the first chuck claws 91. That is, the both of the first and second portions which are held respectively by the first chuck claws 91 and the second chuck claws 92 are designed to be spaced by at least a distance (the predetermined distance) within which the foregoing cutting blade 79 is able to cut the pipe 20, as best shown in FIG. 3.

The first chuck claws 91 take plate-like shapes, whose root ends are secured to first slide pieces 93 (one only shown in FIG. 5) which are mounted on the left end surface of a main body 90 of the first clamping device 81 to be slidable in the radial direction. Since the first slide pieces 93 are reciprocally moved in the radial direction of the pipe 20, the first chuck claws 91 are opened and closed by being also reciprocally moved together therewith in the radial direction of the pipe 20. Contact portions 91a contactable with the internal surface of the pipe 20 are protruded from the outer surfaces of toe portions of the first chuck claws 91. Thus, the first chuck claws 91 are able to grip the pipe 20 at the contact portions 91a when in an open state indicated by the solid line in FIG. 5 and to release the pipe 20 when in a closed state indicated by the two-dot chain line in FIG. 5.

The second chuck claws 92 take plate-like shapes which are longer in the axial direction of the pipe 20 than the first chuck claws 91. The root ends of the second chuck claws 92 are secured to second slide pieces 94 (one only shown in FIG. 5) which are mounted on the left end surface of the main body 90 of the first clamping device 81 to be slidable in the radial direction. Since the second slide pieces 94 are reciprocally moved in the radial direction of the pipe 20, the second chuck claws 92 are opened and closed by being also reciprocally moved together therewith in the radial direction of the pipe 20. Contact portions 92a contactable with the internal surface of the pipe 20 are protruded from the outer surfaces of toe portions of the second chuck claws 91 at a position which is spaced from the contact portions 91a of the first chuck claws 91 in the same direction as the second chuck claws 92 extend. Thus, the second chuck claws 92 are able to grip the pipe 20 at the contact portions 92a when in an open state indicated by the solid line in FIG. 5 and to release the pipe 20 when in a closed state indicated by the two-dot chain line in FIG. 5. Further, recess portions 92b are formed on the radial outer surfaces of the second chuck claws 92 at the side closer to the root end portions than the contact portions 92a each to serve as a space which permits the circumferential edge of the cutting blade 79 to intrude thereinto. Thus, when cutting the pipe 20, the cutting blade 79 can be prevented from cutting or damaging the second chuck claws 92.

The aforementioned first slide pieces 93 are radially slidden upon forward-rearward movement of an inner rod 95 which is driven by an actuator (not shown). More specifically, first links 97 (one only shown) of an L-letter shape which are pivotally carried respectively on support pins 97a (one only shown) are engaged at their one ends with an annular groove 95a formed on one end portion of the inner rod 95 and are also engaged at their other ends with slots 93a (one only shown) formed on the first slide pieces 93, respectively. Thus, when the inner rod 95 is moved to a left end position indicated by the solid line in FIG. 5, the first links 97 are pivoted to the positions (typically indicated by the solid line in FIG. 5) to bring their other ends radially outward, whereby the first slide pieces 93 are brought into the open state to grip the pipe 20. On the contrary, when the inner rod 95 is moved to a right end position indicated by the two-dot chain line in FIG. 5, the first links 97 are pivoted to the positions (typically indicated by the two-dot chain line in FIG. 5) to bring their other ends radially inward, whereby the first slide pieces 93 are brought into the closed state to release the pipe 20.

The aforementioned second slide pieces 94 are also radially slidden upon forward-rearward movement of an outer rod 96 which is driven by another actuator (not shown) and which has the inner rod 95 inserted therethrough. More specifically, second links 98 (one only shown) of an L-letter shape which are pivotally carried respectively on support pins 98a (one only shown) are engaged at their one ends with another annular groove 96a1 formed on a cup member 96a containing the aforementioned one end portion of the inner rod 95. The second links 98 are also engaged at their other ends with slots 94a (one only shown) formed on the second slide pieces 94, respectively. Thus, when the outer rod 96 is moved to a left end position indicated by the solid line in FIG. 5, the second links 98 are pivoted to the positions (typically indicated by the solid line in FIG. 5) to bring their other ends radially outward, whereby the second slide pieces 94 are brought into the open state to grip the pipe 20. On the contrary, when the outer rod 96 is moved to a right end position, the second links 98 are pivoted to the positions (typically indicated by the two-dot chain line in FIG. 5) to bring their other ends radially inward, whereby the second slide pieces 94 are brought into the closed state to release the pipe 20.

Next, description will be made regarding the operation in cutting the pipe 20 of the pipe cutting machine 10 as constructed above. After placing the pipe 20 on the pipe feed frame 12, the operator causes the second clamping device 82 to hold the left end (as viewed in FIG. 1) of the pipe 20 opposite to the right cut end portion to be cut away. Then, with the pipe 20 being so held, the second clamping device 82 is moved toward the cutting apparatus 30 to insert the cut end portion of the pipe 20 into the cutting section 40 of the cutting apparatus 30, that is, into the respective center through holes of the revolution motion member 60, the swing motion member 41 and the rotation motion member 42. This causes the cut end portion of the pipe 20 to have the first and second chuck claws 91, 92 of the first clamping device 81 inserted thereinto. Then, the first and second chuck claws 91, 92 are brought by the manipulation of the operator into the open states, whereby the first chuck claws 91 hold the first portion to be cut away of the pipe 20, while the second chuck claws 92 hold the second portion of the pipe 20 which is to be left without being cut away. In this state, the motor 85 is driven to position the first clamping device 81 onto a desired position, whereby the pipe 20 is positioned at a desired cutting position. During this positioning operation, the second clamping device 82 is slidden on the pipe feed frame 12 to follow the movement of the first clamping device 81 through the pipe 20, so that the same is positioned to the desired cutting position with the opposite ends thereof being maintained held by the first and second clamping devices 81, 82. Then, the cutting of the pipe 20 is performed as follows.

That is, when the rotation motion member 42 is rotated by the rotation drive motor 34, the second and first gears 78, 77 are rotated respectively about their own axes to rotate the cutting blade drive gear 75, and the cutting blade rotational shaft 76 and the cutting blade 79 are rotated about their own axis together with the cutting blade drive gear 75 at the position shown by the two-dot chain line within the arm support member 64 which is located at an upper position indicated by the solid line as viewed in FIG. 4. When the swing motion member 41 is then rotated by the swing drive motor 33, the swingable gear 72 and the pivot shaft 73 are rotated about their own axis, whereby the arm 70 is swung to a cutting infeed position. As a result, the cutting blade 79 now rotating is cut into the pipe 20 at the position indicated by the solid line within the arm support member 64 which is located at the upper position indicated by the solid line as viewed in FIG. 4. Further, when the revolution motion member 60 swingably carrying the arm 70 is thereafter rotated by the revolution drive motor 32 while the swing motion member 41 is also being swung by the swing drive motor 33 in synchronized relation with the revolution. motion member 60, the arm 70 is revolved around the pipe 20 with the cutting blade 79 having been cut into the pipe 20, whereby the rotating cutting blade 79 is revolved around the circumferential portion of the pipe 20, as shown by the two-dot chain line in FIG. 4. Thus, upon completion of one full revolution motion of the revolution motion member 60, the first portion of the pipe 20 which is held by the first chuck claws 91 is cut away from the remaining second portion of the pipe 20 which is held by the second chuck claws 92.

Upon completion of the cutting in the manner as described above, the driving of the rotation drive motor 34 is discontinued to stop the rotations of the rotation motion member 42 and the cutting blade 79. The driving of the revolution drive motor 32 and the swing drive motor 33 is also discontinued to stop the rotations of the revolution motion member 60 and the swing motion member 41 and hence, to stop the revolution and swing motions of the arm 70. Thereafter, when the swing motion member 41 is reversely rotated by the swing drive motor 33, the swingable gear 72 and the pivot shaft 73 are also reversely rotated, whereby the arm 70 is swung in the opposite direction from the cutting infeed position to the home position.

As understood from the foregoing description, in the present embodiment, the rotation motion member 42 is rotated by the rotation drive motor 34 to rotate the cutting blade 79 about the axis of the same. Then, by swinging the arm 70 through the rotation of the swing motion member 41 driven by the swing drive motor 33, the rotating cutting blade 79 is cut into the pipe 20. Further, the revolution motion member 60 swingably carrying the arm 70 is rotated by the revolution drive motor 32, whereby the arm 70 and the rotating cutting blade 79 are revolved around the pipe 20 to cut the same. Accordingly, since the pipe 20 can be cut by the cutting blade 79, the arm 70, the revolution motion member 60, the swing motion member 41 and the rotation motion member 42, the cutting apparatus 30 can be simplified in construction and can be downsized as a whole. Further, since the respective motors 32 to 34 are not mounted on the support member 50 nor on the respective rotational members 60, 41 and 42, but mounted on the main frame 31, the respective rotational members 60, 41 and 42 and the support member 50 which supports these rotational members 60, 41 and 42 can be prevented from becoming great, so that the cutting apparatus 30 can be downsized as a whole.

Further, the swing motion member 41 has the internal teeth 41b, and the arm 70 is provided with the swingable gear 72 which is in meshing with the internal teeth 41b to swing the arm 70. This advantageously simplifies the construction for swinging the arm 70.

Further, the rotation motion member 42 has the internal teeth 42b, and the arm 70 is provided with the cutting blade drive gear 75 which is in meshing with the internal teeth 42b through the first and second gears 77, 78 to rotate the cutting blade 79. This advantageously simplifies the construction for rotating the cutting blade 79.

Further, since the respective rotational members 60, 41 and 42 are rotatated by the respective motors 32 to 34 through the respective belts 35 to 37, it can be realized to transmit the driving powers of the respective motors 32 to 34 to the corresponding rotational members 60, 41 and 42 through a simplified construction.

Further, since the motors 32, 33 for respectively driving the revolution motion member 60 and the swing motion member 41 are constructed by those which are each controllable in the rotational angle and the rotational speed thereof, the rotations of the revolution motion member 60 and the swing motion member 41 can be linked reliably and can be controlled precisely.

In addition, the first clamping device 81 is provided with the plural first chuck claws 91 for holding the internal surface of the first portion which is cut away from the pipe 20 and the plural second chuck claws 92 for holding the internal surface of the second portion of the pipe 20 which is back by a predetermined distance from the first portion to be cut away, and the pipe 20 is cut with the cutting blade 79 between the first and second portions respectively held by the first and second chuck claws 91, 92. Thus, the cut-away first portion and the remaining second portion of the pipe 20 can be prevented from being deformed or being vibrated during the cutting operation. This advantageously results in precisely finishing the cut surfaces of the pipe 20 as well as in performing the cutting operation safely.

Although in the foregoing embodiment, the driving belts 35, 36, 37 are employed as rotation transmission mechanisms which respectively interposed between the respective motors 32, 33, 34 and the respective rotational members 60, 41, 42, one gear or a gear train composed of plural gears may be employed in place of each of the rotation transmission mechanisms.

Although in the foregoing embodiment, the first clamping device 81 is moved and positioned by the operation of the feed motor 85 to bring a portion of the pipe 20 to be cut in alignment with the cutting blade 79, it may be possible to move and position the cutting apparatus 30 instead of the first clamping device 81.

Obviously, further numerous modifications and variations of the present invention are possible in light of the above teachings. It is therefore to be understood that within the scope of the appended claims, the present invention may be practiced otherwise than as specifically described herein.

What is claimed is:

1. A pipe cutting machine having a clamping device for holding a pipe to be cut and a pipe cutting apparatus for cutting the pipe by revolving a rotating disc-like cutting blade around the circumferential surface of the pipe held by the clamping device, the pipe cutting apparatus comprising:
   a main frame;
   a support member secured to the main frame;
   a revolution motion member of an annular shape rotatably supported by the support member;
   an arm pivotally supported on one side surface of the revolution motion member at one end thereof and rotatably carrying the cutting blade at the other end thereof;
   a swing motion member of an annular shape rotatably supported by the support member in axial alignment with the revolution motion member for swinging the arm;
   a rotation motion member of an annular shape rotatably supported by the support member in axial alignment with the revolution motion member for rotating the cutting blade;
   plural motors mounted on the main frame for respectively rotating the revolution motion member, the swing motion member and the rotation motion member; and
   plural rotation transmission mechanisms for transmitting rotational drive powers from the plural motors respectively to the revolution motion member, the swing motion member and the rotation motion member.

2. The pipe cutting machine as set forth in claim 1, wherein the swing motion member has internal teeth, and wherein the arm is provided with a swingable gear which is in meshing engagement with the internal teeth for swinging the arm, so that the arm is swung on the revolution motion member upon rotation of the swing motion member.

3. The pipe cutting machine as set forth in claim 1, wherein the rotation motion member has internal teeth, and wherein the arm is provided with a cutting blade drive gear which is in meshing engagement with the internal teeth of the rotation motion member through one of the rotation transmission mechanisms, so that the cutting blade is rotated on the arm upon rotation of the rotation motion member.

4. The pipe cutting machine as set forth in claim 1, wherein the revolution motion member, the swing motion member and the rotation motion member are juxtaposed with one another in axial alignment to be rotatable in the support member.

5. The pipe cutting machine as set forth in claim 1, wherein each of the rotation transmission mechanisms comprises a driving belt.

6. The pipe cutting machine as set forth in claim 1, wherein each of the motors for respectively rotating the revolution motion member and the swing motion member is constituted by a motor which is controllable in rotational angle and rotational speed thereof.

7. The pipe cutting machine as set forth in claim 1, wherein the clamping device comprises:
 first and second clamping mechanisms for respectively holding a first portion of the pipe to be cut away and a second portion of the pipe to be left without being cut away;
 plural first chuck claws constituting the first clamping mechanism for holding the internal surface of the first portion;
 plural second chuck claws constituting the second clamping mechanism for holding the internal surface of the second portion which is back by a predetermined distance from the first portion, and
 means for effecting the relative movement between the clamping device and the cutting blade in the axis direction of the pipe so that the cutting blade is positioned between the first and second portions of the pipe prior to the cutting of the pipe.

8. The pipe cutting machine as set forth in claim 7, wherein the first and second clamping mechanisms are mounted on a main body of the clamping device so that three first chuck claws are arranged at equiangular intervals in the circumferential direction to be diametrically opposed to three second chuck claws which are also arranged at equiangular intervals in the circumferential direction, and wherein the three second chuck claws are made to be longer in the axial direction of the pipe held thereby than the three first chuck claws and are formed with recesses on their outer surfaces for permitting the cutting blade to be cut into the pipe without cutting the three second chuck claws.

9. The pipe cutting machine as set forth in claim 8, further comprising an additional clamping device which is movable to follow the first mentioned clamping device when the same is moved to position the pipe relative to the cutting blade while opposite ends of the pipe are gripped and held by the additional clamping device and the first mentioned clamping device.

10. The pipe cutting machine as set forth in claim 2, wherein the clamping device comprises:
 first and second clamping mechanisms for respectively holding a first portion of the pipe to be cut away and a second portion of the pipe to be left without being cut away;
 plural first chuck claws constituting the first clamping mechanism for holding the internal surface of the first portion;
 plural second chuck claws constituting the second clamping mechanism for holding the internal surface of the second portion which is back by a predetermined distance from the first portion, and
 means for effecting the relative movement between the clamping device and the cutting blade in the axis direction of the pipe so that the cutting blade is positioned between the first and second portions of the pipe prior to the cutting of the pipe.

11. The pipe cutting machine as set forth in claim 10, wherein the first and second clamping mechanisms are mounted on a main body of the clamping device so that three first chuck claws are arranged at equiangular intervals in the circumferential direction to be diametrically opposed to three second chuck claws which are also arranged at equiangular intervals in the circumferential direction, and wherein the three second chuck claws are made to be longer in the axial direction of the pipe held thereby than the three first chuck claws and are formed with recesses on their outer surfaces for permitting the cutting blade to be cut into the pipe without cutting the three second chuck claws.

12. The pipe cutting machine as set forth in claim 11, further comprising an additional clamping device which is movable to follow the first mentioned clamping device when the same is moved to position the pipe relative to the cutting blade while opposite ends of the pipe are gripped and held by the additional clamping device and the first mentioned clamping device.

13. The pipe cutting machine as set forth in claim 3, wherein the clamping device comprises:
 first and second clamping mechanisms for respectively holding a first portion of the pipe to be cut away and a second portion of the pipe to be left without being cut away;
 plural first chuck claws constituting the first clamping mechanism for holding the internal surface of the first portion;
 plural second chuck claws constituting the second clamping mechanism for holding the internal surface of the second portion which is back by a predetermined distance from the first portion, and
 means for effecting the relative movement between the clamping device and the cutting blade in the axis direction of the pipe so that the cutting blade is positioned between the first and second portions of the pipe prior to the cutting of the pipe.

14. The pipe cutting machine as set forth in claim 13, wherein the first and second clamping mechanisms are mounted on a main body of the clamping device so that three first chuck claws are arranged at equiangular intervals in the circumferential direction to be diametrically opposed to three second chuck claws which are also arranged at equiangular intervals in the circumferential direction, and wherein the three second chuck claws are made to be longer in the axial direction of the pipe held thereby than the three first chuck claws and are formed with recesses on their outer surfaces for permitting the cutting blade to be cut into the pipe without cutting the three second chuck claws.

15. The pipe cutting machine as set forth in claim 14, further comprising an additional clamping device which is movable to follow the first mentioned clamping device when the same is moved to position the pipe relative to the cutting blade while opposite ends of the pipe are gripped and held by the additional clamping device and the first mentioned clamping device.

16. The pipe cutting machine as set forth in claim 4, wherein the clamping device comprises:
  first and second clamping mechanisms for respectively holding a first portion of the pipe to be cut away and a second portion of the pipe to be left without being cut away;
  plural first chuck claws constituting the first clamping mechanism for holding the internal surface of the first portion;
  plural second chuck claws constituting the second clamping mechanism for holding the internal surface of the second portion which is back by a predetermined distance from the first portion, and
  means for effecting the relative movement between the clamping device and the cutting blade in the axis direction of the pipe so that the cutting blade is positioned between the first and second portions of the pipe prior to the cutting of the pipe.

17. The pipe cutting machine as set forth in claim 16, wherein the first and second clamping mechanisms are mounted on a main body of the clamping device so that three first chuck claws are arranged at equiangular intervals in the circumferential direction to be diametrically opposed to three second chuck claws which are also arranged at equiangular intervals in the circumferential direction, and wherein the three second chuck claws are made to be longer in the axial direction of the pipe held thereby than the three first chuck claws and are formed with recesses on their outer surfaces for permitting the cutting blade to be cut into the pipe without cutting the three second chuck claws.

18. The pipe cutting machine as set forth in claim 17, further comprising an additional clamping device which is movable to follow the first mentioned clamping device when the same is moved to position the pipe relative to the cutting blade while opposite ends of the pipe are gripped and held by the additional clamping device and the first mentioned clamping device.

\* \* \* \* \*